US012063481B2

(12) United States Patent
Monti et al.

(10) Patent No.: US 12,063,481 B2
(45) Date of Patent: Aug. 13, 2024

(54) BALANCED ARMATURE RECEIVER HAVING DAMPING COMPOUND-LOCATING STRUCTURE

(71) Applicant: Knowles Electronics, LLC, Itasca, IL (US)

(72) Inventors: Christopher L. Monti, Elgin, IL (US); Thomas E. Miller, Arlington Heights, IL (US); Charles B. King, Oak Park, IL (US); Kalyan Nadella, West Lafayette, IN (US); Mohammad Mohammadi, Rolling Meadows, IL (US)

(73) Assignee: Knowles Electronics, LLC, Itasca, IL (US)

( * ) Notice: Subject to any disclaimer, the term of this patent is extended or adjusted under 35 U.S.C. 154(b) by 86 days.

(21) Appl. No.: 17/889,352

(22) Filed: Aug. 16, 2022

(65) Prior Publication Data

US 2024/0064479 A1 Feb. 22, 2024

(51) Int. Cl.

*H04R 25/00* (2006.01)
*H04R 9/02* (2006.01)
*H04R 11/02* (2006.01)

(52) U.S. Cl.

CPC ........... *H04R 25/604* (2013.01); *H04R 9/025* (2013.01); *H04R 11/02* (2013.01); *H04R 25/65* (2013.01); *H04R 2209/024* (2013.01)

(58) Field of Classification Search

CPC ........ H04R 9/025; H04R 11/00; H04R 11/02; H04R 25/604; H04R 25/65; H04R 2209/024

See application file for complete search history.

(56) References Cited

U.S. PATENT DOCUMENTS

| | | | | |
|---|---|---|---|---|
| 4,272,654 A * | 6/1981 | Carlson | H04R 11/00 381/418 |
| 5,647,013 A | 7/1997 | Salvage et al. | |
| 6,041,131 A | 3/2000 | Kirchhoefer et al. | |
| 6,658,134 B1 * | 12/2003 | van Hal | H04R 11/02 381/418 |
| 7,236,609 B1 | 7/2007 | Tsangaris et al. | |
| 7,995,789 B2 | 8/2011 | Tsangaris et al. | |
| 8,494,209 B2 | 6/2013 | Miller et al. | |
| 9,485,585 B2 | 11/2016 | McCratic et al. | |
| 10,945,077 B2 | 3/2021 | Scheleski | |

(Continued)

FOREIGN PATENT DOCUMENTS

CN 203951286 U 11/2014

*Primary Examiner* — Huyen D Le

(74) *Attorney, Agent, or Firm* — Loppnow & Chapa; Matthew C. Loppnow

(57) ABSTRACT

A balanced armature receiver can include a motor disposed in a case. The motor can include an armature having a first portion fixed to and extending from a yoke and a second portion extending through a coil tunnel. The second portion can have a free end-portion movably disposed in a magnet gap. The balanced armature receiver can include a damping compound-locating structure disposed on one or both of the armature and another portion of the receiver proximate the armature. The balanced armature receiver can include damping compound contacting the damping compound-locating structure and located between the armature and another portion of the receiver.

17 Claims, 9 Drawing Sheets

(56) References Cited

U.S. PATENT DOCUMENTS

| | | | |
|---|---|---|---|
| 2007/0036378 A1 | 2/2007 | Saltykov et al. | |
| 2013/0279732 A1 | 10/2013 | Sanecki et al. | |
| 2015/0201293 A1 | 7/2015 | Sanecki et al. | |
| 2019/0208301 A1 | 7/2019 | Monti et al. | |
| 2019/0208326 A1* | 7/2019 | Scheleski | H04R 9/025 |
| 2020/0213787 A1 | 7/2020 | Houcek et al. | |
| 2020/0213788 A1 | 7/2020 | Albahri | |

* cited by examiner

BALANCED ARMATURE RECEIVER HAVING DAMPING COMPOUND-LOCATING STRUCTURE

BACKGROUND

1. Field

The present disclosure is generally directed to balanced armature receivers. More particularly, the present disclosure is directed to a balanced armature receiver having improved shock resistance.

2. Introduction

Presently, balanced armature receivers (also referred to herein as "receivers") are capable of producing an acoustic output signal in response to an electrical audio signal. Receivers are commonly used in hearing aids, wired and wireless earphones, True Wireless Stereo (TWS) devices, among other in-ear and on-ear hearing devices. Balanced armature receivers generally comprise a housing in the form of a cup and cover enclosing a diaphragm that separates an interior of the housing into a back and front volumes. An electromagnetic motor located in the back volume includes an electrical coil disposed about an armature (also referred to herein as a "reed") having a free end portion movably disposed between permanent magnets retained by a yoke. A drive rod or ribbon mechanically connects the movable portion of the reed to a movable portion of the diaphragm known as a paddle. The reed vibrates between the magnets in response to an electrical signal representing sound applied to the coil. Otherwise, the reed is balanced between the magnets. The moving paddle expels sound out of a sound port of the housing via the front volume. However, the reed is susceptible to plastic deformation or other damage when subject to a shock event, which may result from dropping the receiver or host device. Thus, there is a need for receivers having improved robustness or shock resistance.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore considered to limit its scope. The drawings may have been simplified for clarity and are not necessarily drawn to scale.

DETAILED DESCRIPTION

The disclosure relates generally to balanced armature receivers having improved shock resistance. The receiver generally comprises a diaphragm disposed in and separating an interior of a housing (also referred to herein as a "case") into a back volume and a front volume acoustically coupled to an exterior of the case via a sound port. A motor disposed in the case comprises a yoke retaining two magnets separated by a gap, an armature connected to the diaphragm and movably disposed in the gap, and an electrical coil assembly magnetically coupled to the armature. A damping compound-locating structure locates a damping compound between one or more portions of the armature and one or more portions of the receiver to improve shock performance.

A balanced armature receiver can be damaged by dropping the receiver, by shock caused to the receiver, by tumbling of the receiver, and by other events that cause damage to the receiver. For example, the reed typically comprises a material with relatively low yield strength that can bend when subjected to extreme acceleration events. Once bent, the acoustic response of the balanced armature receiver can be distorted or deviate from a desired performance specification. The reed can benefit from additional support to prevent or reduce damage resulting from shock events. Increased benefit can be gained from materials with some flexibility, self-healing ability, and/or damping properties. Such materials are referred to herein as "damping compounds". The goal can often, but not always, be to have minimal impact on acoustic response of the balanced armature receiver when these support materials are added. In some cases, the support materials can provide some benefits to the acoustic response of the balanced armature receiver.

A damping compound-locating structure can be used to help consistently position the damping compound in desired locations during manufacturing. The damping compound-locating structure locates and restricts flow of the damping compound from the desired location until the damping compound cures or sets. The damping compound can wick into one or more small gaps formed by the damping compound-locating structures as surface tension limits flow into larger gaps. The damping compound-locating structure can be located on a portion of the armature or on another portion of the receiver between which the damping compound is located.

Figure 1:
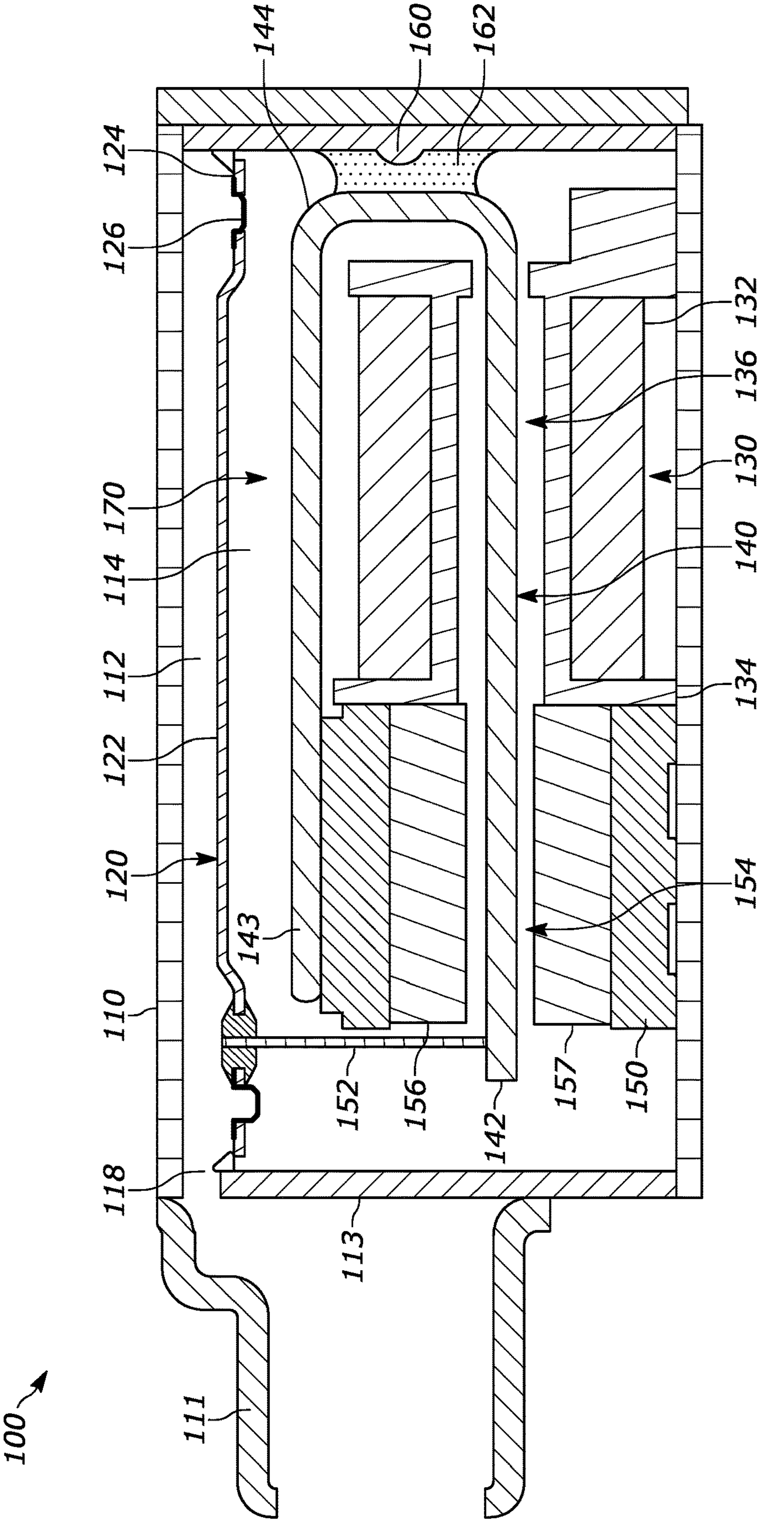
FIG. 1 is a side cross-sectional view of a balanced armature receiver according to a possible embodiment.

FIG. 1 is a side cross-sectional view of an example balanced armature receiver 100 according to a possible embodiment. Different embodiments describe and illustrate elements of the receiver with particular shapes and sizes, but all elements of the receiver can have different shapes and sizes than those shown or described. The receiver 100 can include a housing or case 110, and a diaphragm 120 disposed within and separating an interior of the housing into a front volume 112 and a back volume 114. The front volume can be acoustically coupled to an exterior of the housing via a sound port located on a housing wall defining the front volume. In FIG. 1, the sound port 118 is located on an end wall portion 113 perpendicular to the diaphragm 120. Alternatively, the sound port can be located on other housing sidewalls perpendicular to the diaphragm or on a housing wall portion parallel to the diaphragm. The receiver 100 includes a nozzle 111 disposed over the sound port 118 and coupled to the end wall portion 113 or other portion of the housing. Other receivers do not include a nozzle.

The diaphragm 120 comprises a movable portion 122 (e.g., a paddle) movable relative to a frame 124 disposed about a periphery of the paddle. A gap separates the paddle from the frame and a flexible or elastic film 126 covers the gap and permits the paddle to move relative to the frame when driven by the motor. The film can cover the entire paddle and frame or only regions of the paddle and frame adjacent to the gap. The film can also cover any massreducing apertures in the paddle in embodiments where such apertures are present. The film can be urethane, Mylar or siloxane, among other known or future materials suitable for this purpose. In other implementations, a surround couples the movable portion of the paddle to a frame or directly to the housing. In some implementations, the diaphragm 120 includes a barometric relief vent (not shown) through the paddle 122, frame 124, or film 126 to equalize pressure in the back and front volumes. In these implementations, the back volume vents to the exterior of the housing via the front volume. Alternatively, the barometric relief vent can be located in a wall portion of the housing defining the back volume, which vents directly to an exterior of the housing instead of via the front volume.

Figure 2A:
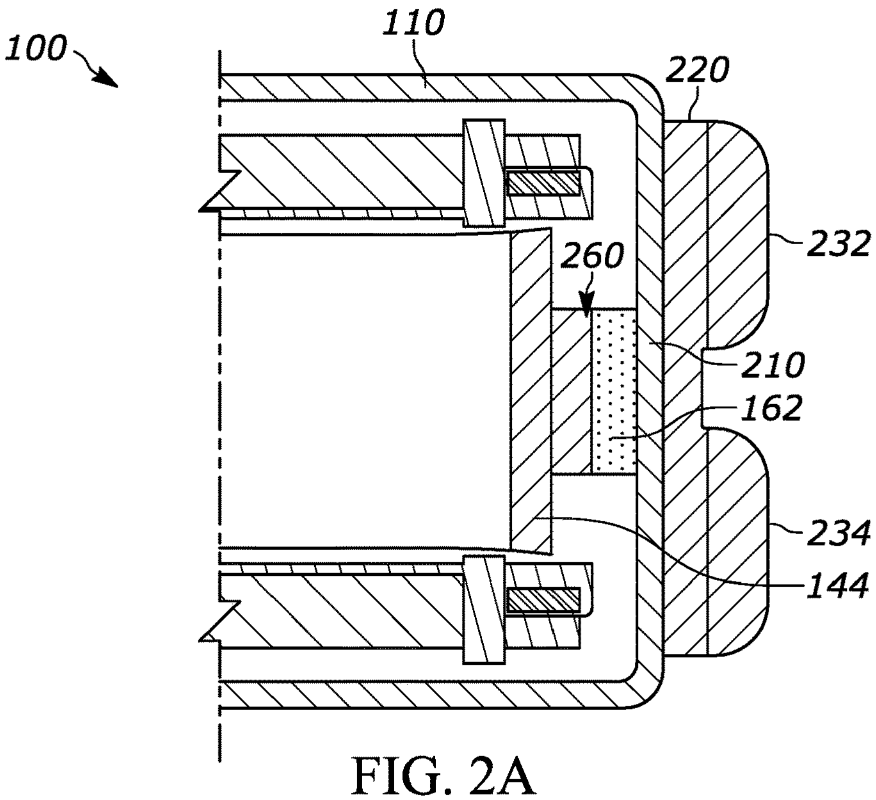
FIGS. 2A and 2B are example plan views of a receiver according to different possible embodiments.
Figure 2B:
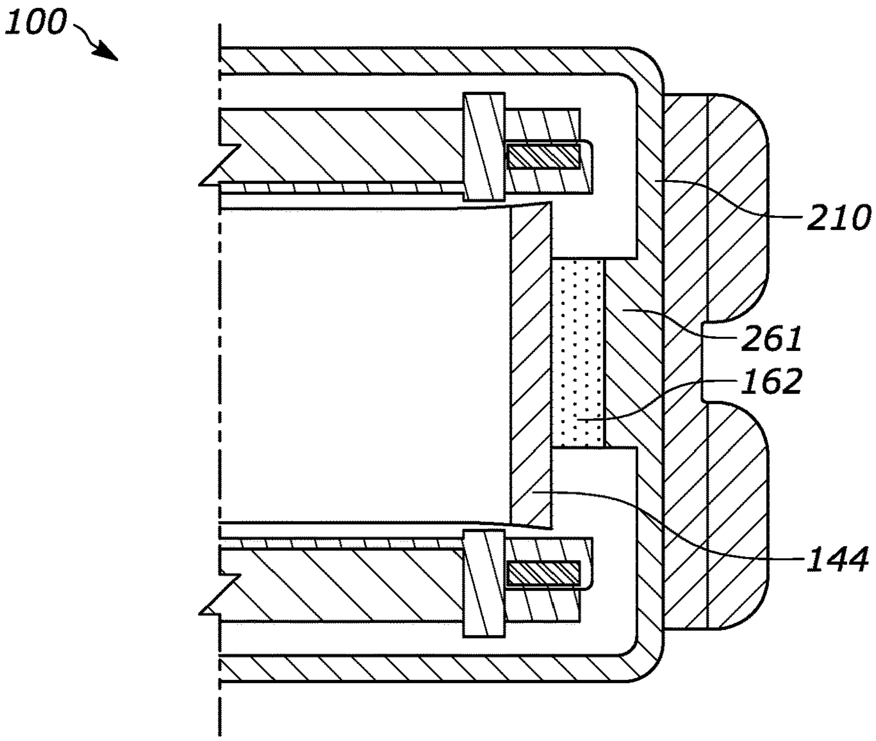

The receiver also includes a motor 170 disposed in the back volume for actuating the diaphragm. In other possible embodiments, the motor 170 can be located in the front volume instead of the back volume, or in both the front and back volumes. The motor includes an electrical coil assembly 130 comprising an insulated wire formed into a coil 132 bound by glue, adhesive or other means. In FIG. 1, the coil 132 is supported by a bobbin 134 defining a coil tunnel 136 for accommodating an armature discussed below. The coil assembly need not include a bobbin, in which case the coil defines the coil tunnel. The coil includes wire leads connected to corresponding terminals to which an audio signal is applied from an exterior of the receiver. In FIGS. 2A and 2B, a printed circuit board 220 comprises terminals 232, 234 located on an end wall of the housing for this purpose. Alternatively, the terminals can be located on another surface or portion of the housing.

The motor 170 includes permanent magnets 156, 157 separated by a gap 154 aligned with the coil tunnel 136 and can be retained by a yoke 150. The yoke can be a single-piece stamped folded yoke, an extruded yoke, or stacked rings retained by welds, adhesives, or other means, or can have some other structure that may or may not include a portion of the case. An armature 140 comprises a fixed portion 143 connected to the yoke and a free-end portion 142 extending through the coil tunnel and movably located in the gap between the magnets. The fixed portion 143 can be welded, secured with adhesives, or otherwise attached to the yoke 150. The free-end portion 142 can be coupled to the paddle by a drive rod or other link 152. The armature 140 is a U-reed with a U-shaped portion 144 interconnecting the free-end portion 142 and the fixed portion 143. Alternatively, the armature 140 can also have other forms, such as an E-reed, M-reed, or T-reed, among other reed configurations.

The receiver can include damping compound disposed between the armature and one or more other portions of the receiver proximate the armature to improve shock performance. The damping compound-locating structure creates a relatively small gap between portions of the receiver. The small gap helps locate and retain the damping compound in the desired location when the damping compound is in a low viscosity state prior to drying, cooling, or curing. Thus, the damping compound-locating structure can capture the damping compound and retain it until the damping compound cures or otherwise becomes more viscous. The damping compound-locating structure can prevent the damping compound from migrating to less-desirable locations of the receiver, where it may adversely affect the acoustic performance of the receiver. The damping compound-locating structure can be made from the same material as or part of the housing or other components. For example, the damping compound-locating structure can be an integral part of the armature or other portion of the receiver. Such structure can be an existing or intrinsic part of the receiver, or portions of the receiver can be modified (e.g., in a deformation process) to form a protrusion or dimple that locates the damping compound. Alternatively, the damping compound-locating structure or portion thereof can be a discrete element affixed to one or more portions of the receiver. Also, the damping compound-locating structure can be located on one or both portions of the receiver between which the damping compound is located. Representative implementations are described further herein.

In FIGS. 1, 2A and 2B, damping compound 162 located between the U-shaped portion of the armature and a sidewall portion of the housing improves shock resistance of the receiver. A damping compound-locating structure on the armature or sidewall, or on both the armature and sidewall, locates the damping compound as described herein. In FIGS. 1 and 2B, the damping compound-locating structure 160, 261, respectively, is located on the housing sidewall 210. Such structure can be formed by stamping a protrusion in the sidewall or by fastening a discrete element thereto. In FIG. 2A, the damping compound-locating structure 260 is disposed on an outer perimeter or portion of the U-shaped portion 144 of the armature. Such structure can be formed by stamping a protrusion in the armature or by fastening a discrete element thereto.

Figure 3:
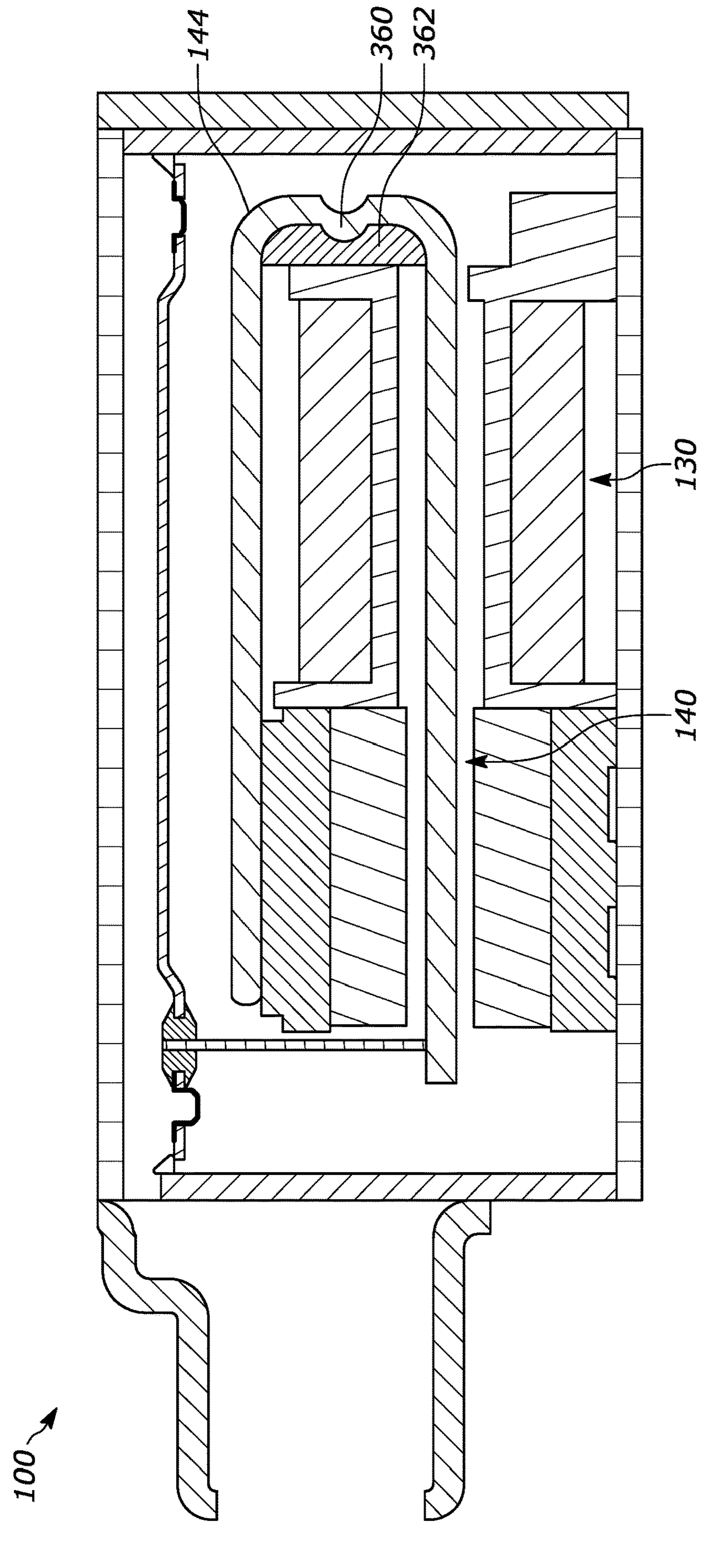
FIGS. 3-6 are example side cross-sectional views of a receiver according to different possible embodiments.

In FIGS. 3-6, damping compound disposed between a portion of the electrical coil assembly and the armature improves shock performance of the receiver. In FIG. 3, a damping compound-locating structure 360 formed on the reed locates the damping compound 362 between the inner perimeter of the U-shaped portion 144 of the armature 140 and the bobbin of the electrical coil assembly 130. Alternatively, the damping compound can be located between U-shaped portion and a coil assembly devoid of a bobbin. The damping compound-locating structure 360 or portion thereof can be formed integrally with the armature or coil assembly. Alternatively, the damping compound-locating structure or portion thereof can be a discrete element affixed to the armature or coil assembly.

Figure 4:
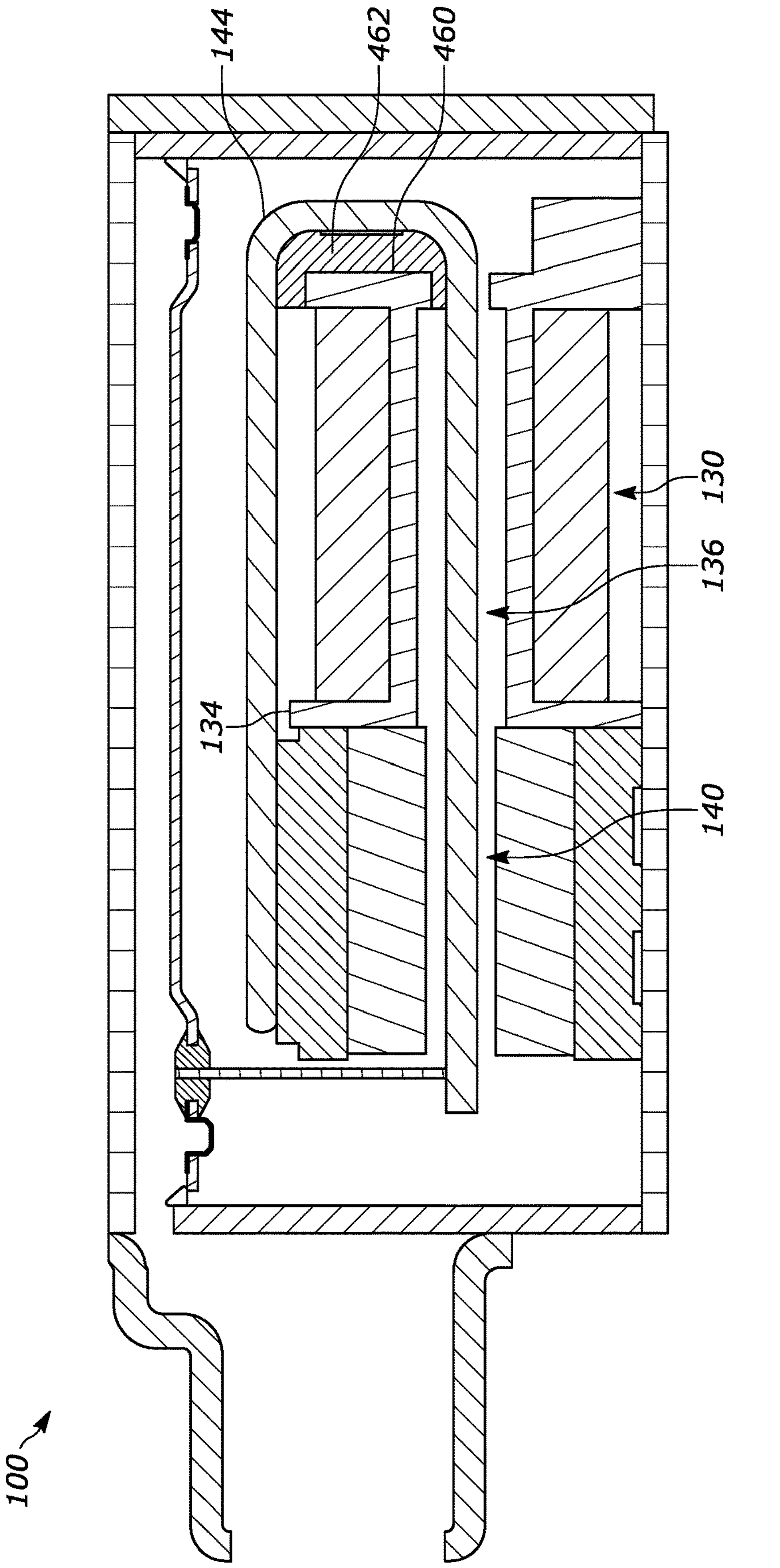
Figure 5:
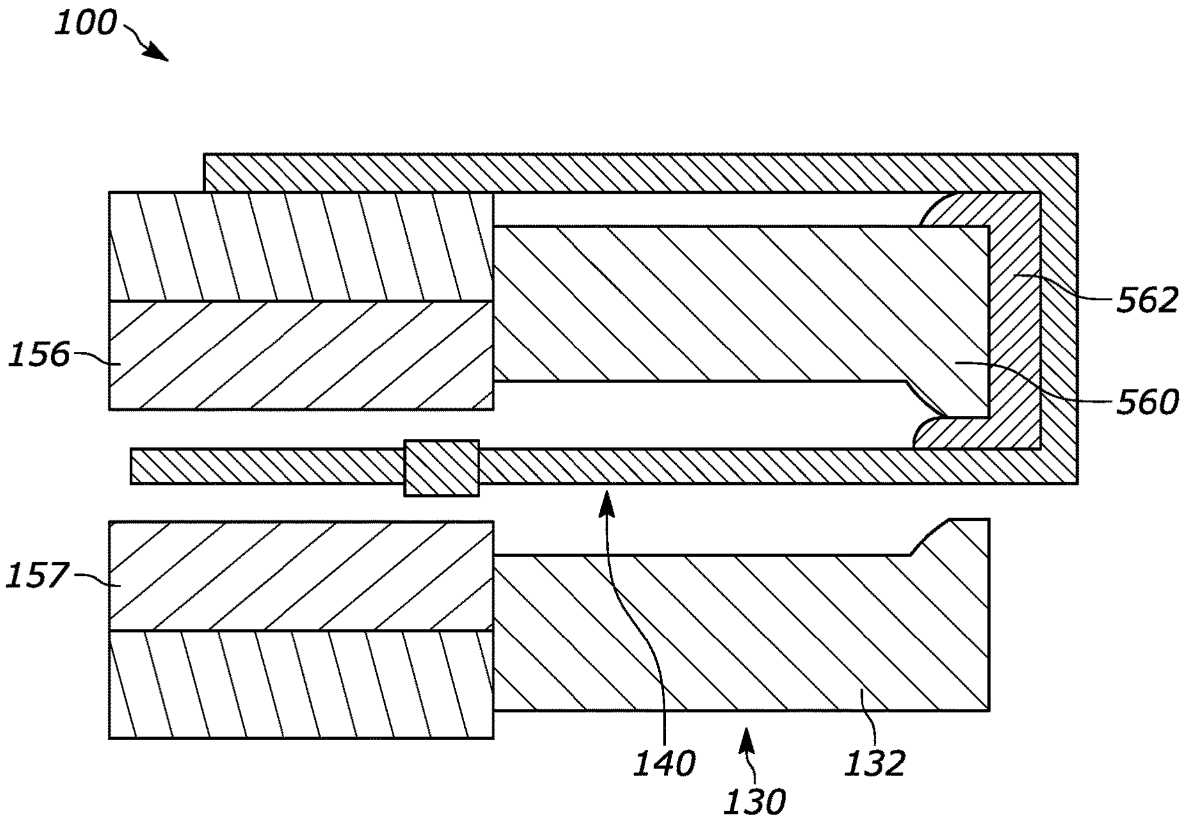
Figure 6:
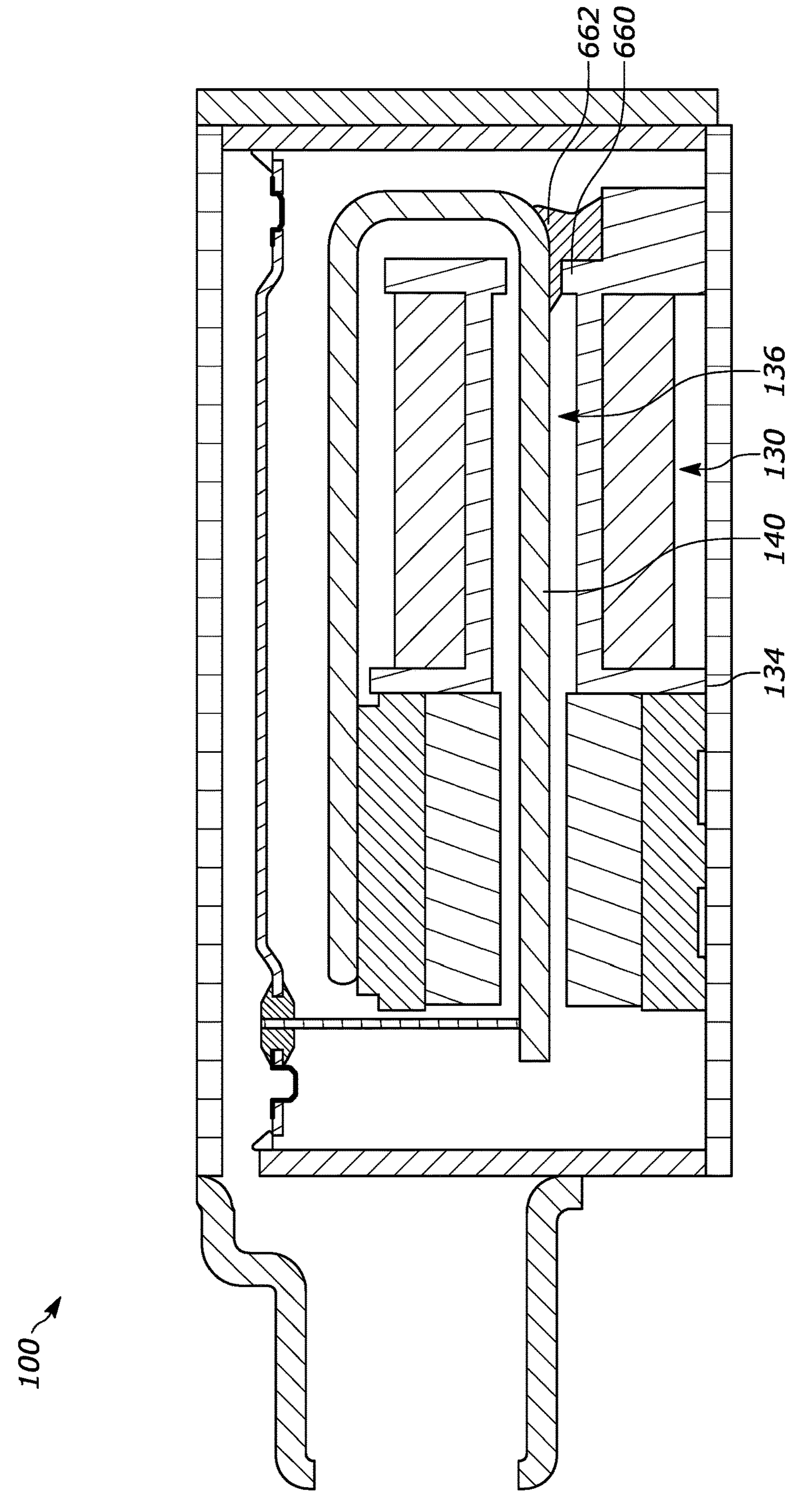

In FIG. 4, the coil bobbin 134 of the electrical coil assembly includes a damping compound-locating structure 460 that locates and prevents the damping compound 462 from migrating into the coil tunnel. The damping compound-locating structure 460 can be an integral part of the bobbin or a discrete element affixed to the bobbin or to the coil in cases where there is no bobbin. In FIG. 5, the electrical coil assembly 130 is devoid of a bobbin and the damping compound-locating structure that locates the damping compound 562 is implemented as a rib 560 protruding from a portion of the coil. The rib 560 can formed of an epoxy that binds the insulated wire forming the coil assembly or the rib can be a discrete element affixed to the coil. In FIG. 6, damping compound is disposed between a portion of the electrical coil assembly and an outer perimeter of the U-shaped portion of the armature. Particularly, the bobbin 134 of the electrical coil assembly includes a damping compound-locating structure 660 that locates and prevents the damping compound from migrating into the coil tunnel. The damping compound-locating structure 660 can be an integral part of the coil bobbin or a discrete element fastened to the bobbin or to the coil in cases where there is no bobbin.

Figure 7:
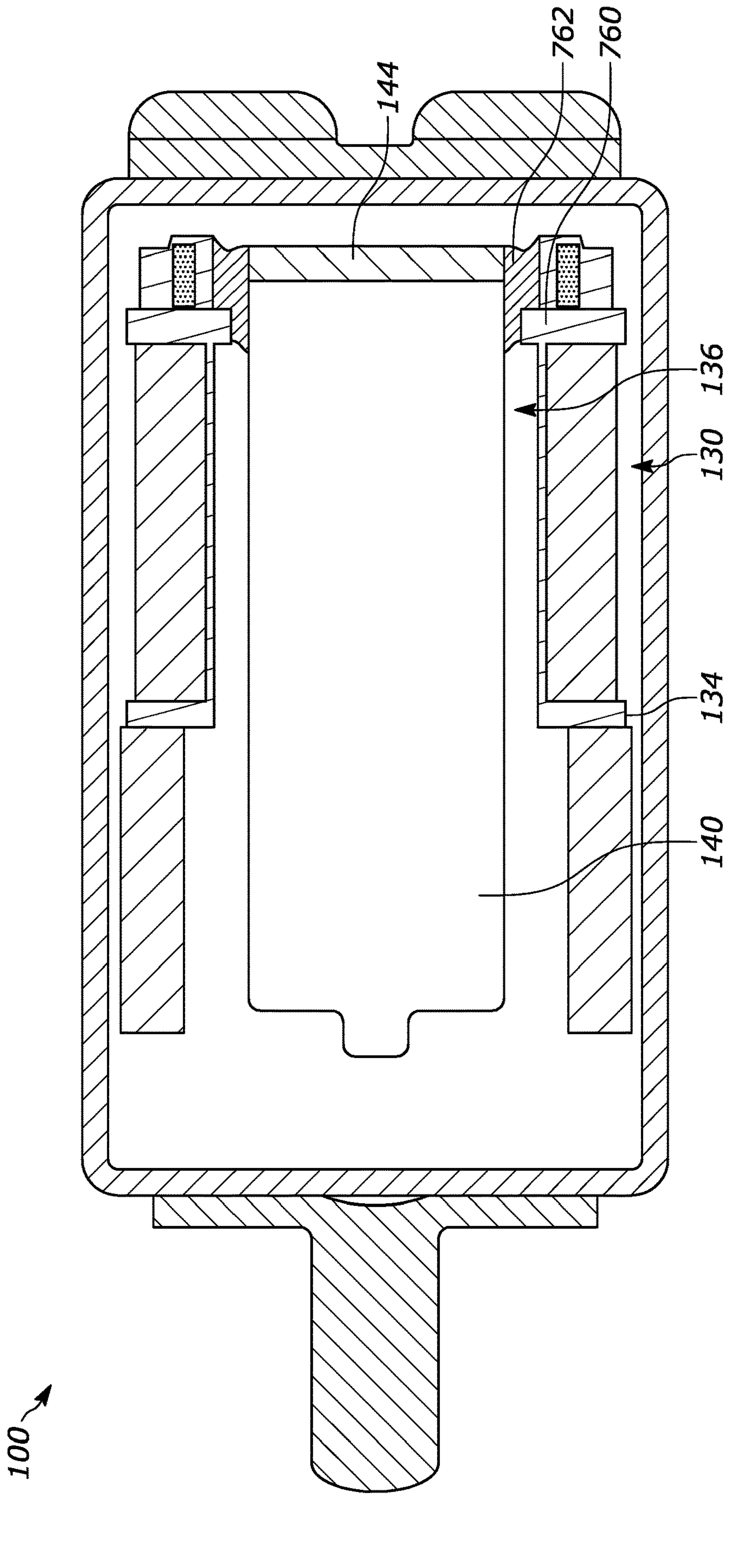
FIGS. 7 and 8 are example plan cross-sectional views of a receiver according to another possible embodiment.
Figure 8:
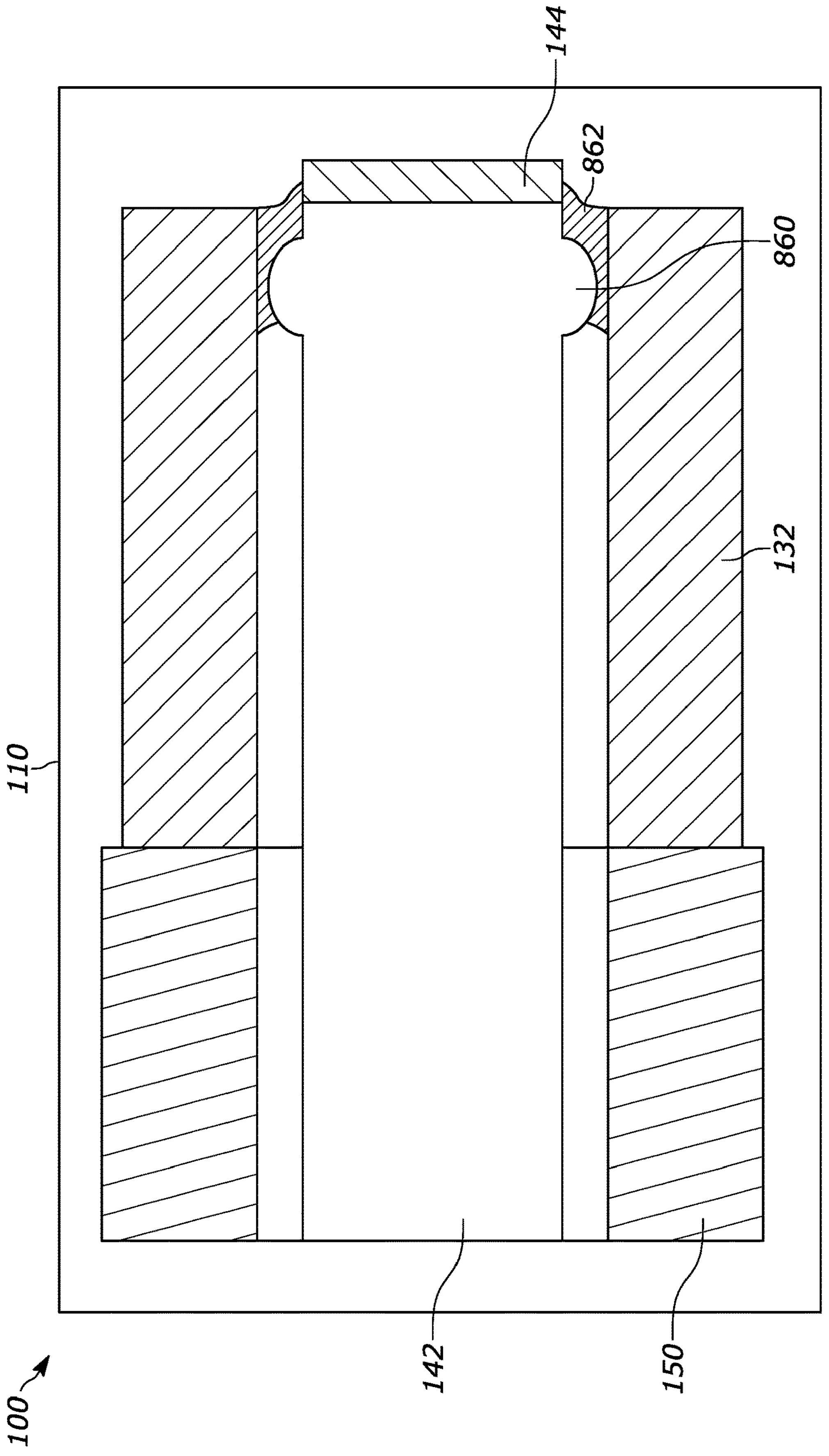

In FIGS. 7 and 8, damping compound disposed between one or both lateral side portions of the armature and corresponding portions of the electrical coil assembly improves the shock performance of the receiver. In these embodiments, the armature can be configured as a U-reed or an E-reed among other configurations. In U-reed applications, the damping compound can be located between the coil assembly (e.g., the bobbin or coil) and the armature. In FIG. 7, the damping compound-locating structure 760 is located on a side the bobbin 134 and protrudes into the coil tunnel toward a lateral side of the armature 140. The damping compound 762 is located between the damping compound-locating structure 760 and a portion of the armature 140. Damping compound can also be located between both lateral sides of the armature and corresponding portions of the coil assembly. In FIG. 8, the damping compound-locating structure is a protrusion 860 disposed on one or both lateral sides of the armature and extending toward the coil 132. The damping compound 862 is located between the compound-locating structure 860 and the bobbin.

Figure 9:
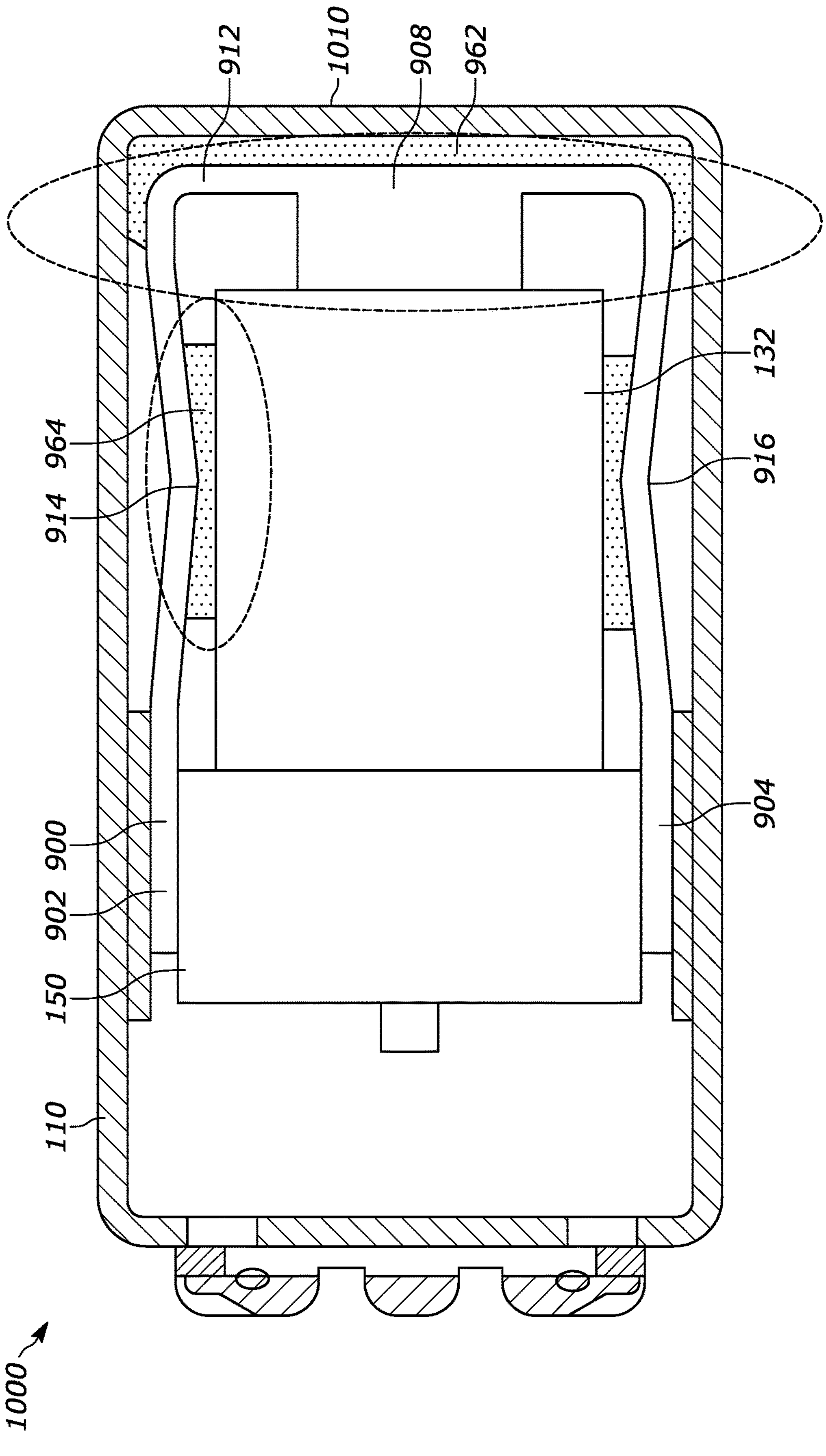
FIG. 9 is an example plan cross-sectional view of a balanced armature receiver including an E-reed according to a possible embodiment.

FIG. 9 is an example plan cross-sectional view of a balanced armature receiver 1000 including the E-reed 900 comprising first and second arms 902, 904 fixed to and extending from the yoke 150. Damping compound 962 can be located between the end portion 908 of the armature and an end wall portion 1010 of the case 110 opposite the end portion 908. The damping compound-locating structure can be located on the end portion 908 of the armature or on the wall portion 1010 of the case as described above in connection with FIGS. 1, 2A and 2B.

In some embodiments, the first and second arms 902 and 904 of the E-reed are bent so that apexes 914, 916 protrude toward the coil 132. The damping compound-locating structure can be implemented as the end portion 908 and the corners 912, the corners connecting the first and second arms 902, 904 to the end portion 908 of the armature. The arms 902, 904 form a relatively small gap between the corners 912 and corresponding wall portions of the case 110, wherein the small gap locate and retains the damping compound 962 between the corners and wall portions of the case 110. Alternatively, the apexes 914, 916 correspond to the damping compound-locating structures and function to locate damping compound 964 between the arms 902, 904 and the coil assembly.

The receiver can include damping compound in one or more of the locations shown in the representative implementations shown in FIGS. 1-9 and described herein. The acoustic performance specification of the receiver may influence suitable locations for the damping compound and its mechanical properties. There may also be a tradeoff between shock resistance and acoustic performance of the receiver. For example, more viscous or stiffer damping compounds can be suitable for use in locations that tend not to restrict movement of the armature between the magnets compared to locations that do restrict movement of the armature. Damping compounds having a modulus of elasticity less than 400 megapascals (mPa) and in some implementations less than 100 mPa are found to be suitable for the representative implementations. In some materials the modus of elasticity may be frequency dependent. For example, a modulus of elasticity at reed operating modes, such as 2 k to 10 kHz, at room temperature can be less than 400 MPa, less than 100 MPa, less than 40 MPa, or any other useful modulus of elasticity.

The damping compound at reed operating modes can have a damping ratio greater than 10%, greater than 25%, or greater than 40%. The damping ratio is the ratio of damping of the material to the damping of the material if the material were critically damped. The damping compound can be a resilient material, which can be a solid, can be a non-Newtonian fluid, can have surface energy properties that retain certain shapes (e.g., contours), and can have other useful properties.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A balanced armature receiver comprising:

a case including a sound port;

a diaphragm disposed in the case and separating an interior of the case into a back volume and a front volume acoustically coupled to an exterior of the case via the sound port;

a motor disposed in the case, the motor comprising:

a yoke retaining two magnets separated by a gap, an armature connected to the diaphragm and movably disposed in the gap, and an electrical coil assembly magnetically coupled to the armature;

a damping compound-locating structure disposed on one or both of the armature and another portion of the receiver proximate the armature; and damping compound contacting the damping compound-locating structure and located between the armature and the another portion of the receiver.

2. The receiver of claim 1, wherein the damping compound-locating structure is a protrusion forming a relatively narrow gap between the armature and the another portion of the receiver.

3. The receiver of claim 2, wherein the armature is a U-reed comprising a first arm fixed to the yoke and a second arm movably disposed in the gap and connected to the diaphragm, and a U-shaped portion interconnecting the first arm and the second arm.

4. The receiver of claim 3, the damping compound-locating structure disposed on the U-shaped portion or on a wall portion of the case opposite the U-shape portion, and the damping compound located between the U-shaped portion and the wall portion of the case opposite the U-shaped portion.

5. The receiver of claim 3, the damping compound-locating structure disposed on a portion of the electrical coil assembly located within a perimeter defined by the U-shaped portion, and the damping compound located between the electrical coil assembly and the armature.

6. The receiver of claim 5, the electrical coil assembly including a bobbin, wherein the damping compound-locating structure is disposed on a portion of the bobbin.

7. The receiver of claim 3, the damping compound-locating structure disposed on a portion of the electrical coil assembly located outside a perimeter of the armature, and the damping compound located between the electrical coil assembly and a portion of the armature.

8. The receiver of claim 7, the electrical coil assembly including a bobbin, wherein the damping compound-locating structure is disposed on a portion of the bobbin.

9. The receiver of claim 2, the damping compound-locating structure disposed on lateral side portions of the armature, and the damping compound located between lateral side portions of the armature and corresponding portions of the electrical coil assembly.

10. The receiver of claim 9, the armature is a U-reed having a U-shaped portion interconnecting fixed and movable arm, the damping compound-locating structure disposed on outer side portions of the movable arm proximate to the U-shaped portion.

11. The receiver of claim 1, the armature is an E-reed comprising a first arm and a second arm, the first and second arms coupled to and extending from the yoke, an end portion of the E-reed connecting the first and second arms, and a movable portion connected to the end portion, the damping compound located between the end portion of the E-reed and a wall portion of the case opposite the end portion, the damping compound-locating structure located on the end portion or on the wall portion of the case.

12. The receiver of claim 1, the damping compound-locating structure located on the case.

13. The receiver of claim 1, the damping compound located between the coil assembly and the movable portion of the armature.

14. The receiver of claim 1, the damping compound having a modulus of elasticity less than 400 megapascals.

15. The receiver of claim 14, the damping compound having a modulus of elasticity less than 100 megapascals.

16. The receiver of claim 1, the damping compound having a damping ratio greater than 10%.

17. The receiver of claim 16, the damping compound having a damping ratio more than 25%.

* * * * *